(12) United States Patent
Suiter et al.

(10) Patent No.: US 10,502,584 B1
(45) Date of Patent: Dec. 10, 2019

(54) MISSION MONITOR AND CONTROLLER FOR AUTONOMOUS UNMANNED VEHICLES

(71) Applicants: Sean Patrick Suiter, Omaha, NE (US); Richard Andrew Kruse, Lincoln, NE (US)

(72) Inventors: Sean Patrick Suiter, Omaha, NE (US); Richard Andrew Kruse, Lincoln, NE (US)

(*) Notice: Subject to any disclaimer, the term of this patent is extended or adjusted under 35 U.S.C. 154(b) by 0 days.

(21) Appl. No.: 16/217,715

(22) Filed: Dec. 12, 2018

Related U.S. Application Data

(63) Continuation of application No. 15/243,752, filed on Aug. 22, 2016, now abandoned, which is a continuation of application No. 15/159,202, filed on May 19, 2016, now Pat. No. 9,821,910, which is a continuation of application No. 14/741,283, filed on Jun. 16, 2015, now Pat. No. 9,310,222, which is a continuation of application No. 14/142,390, filed on Dec. 27, 2013, now abandoned.

(Continued)

(51) Int. Cl.
| | |
|---|---|
| *G01C 23/00* | (2006.01) |
| *G07C 5/08* | (2006.01) |
| *B64C 39/02* | (2006.01) |
| *B64D 45/00* | (2006.01) |
| *G08G 5/00* | (2006.01) |
| *B64D 43/00* | (2006.01) |

(52) U.S. Cl.
CPC .......... *G01C 23/005* (2013.01); *B64C 39/024* (2013.01); *B64D 43/00* (2013.01); *B64D 45/00* (2013.01); *G07C 5/0808* (2013.01); *G07C 5/0816* (2013.01); *G08G 5/003* (2013.01); *G08G 5/0021* (2013.01); *G08G 5/0078* (2013.01); *G08G 5/0091* (2013.01); *B64C 2201/021* (2013.01); *B64C 2201/024* (2013.01); *B64C 2201/141* (2013.01); *B64D 2045/0085* (2013.01)

(58) Field of Classification Search
CPC .................................................... G01C 23/005
See application file for complete search history.

(56) References Cited

U.S. PATENT DOCUMENTS

| | | | |
|---|---|---|---|
| 4,438,475 A | 3/1984 | Haley | |
| 5,136,297 A * | 8/1992 | Lux | G01C 21/005 |
| | | | 342/33 |

(Continued)

*Primary Examiner* — Alex C Dunn
(74) *Attorney, Agent, or Firm* — Suiter Swantz pc llo

(57) ABSTRACT

A system and related method for monitoring the performance of one or more autonomous unmanned aircraft (UA) includes a flight assistant for periodically determining the viability of an aircraft flight command, flight, or mission by comparing expected flight segment configuration and performance against at least actual performance. The flight assistant may trend actual performance as a function of differences in expected position and actual position and determine whether a flight command, flight, or mission may be performed or continued according to a hierarchy of user selectable detected anomalies or safety concerns. The flight assistant may report to an operator, controller, pilot, or monitor a rate of deviation, size of deviation, or change in the rate of deviation in accordance with a hierarchy based at least in part on flight segment, altitude, proximity to people or things.

19 Claims, 10 Drawing Sheets

Related U.S. Application Data

(60) Provisional application No. 62/210,686, filed on Aug. 27, 2015, provisional application No. 62/207,835, filed on Aug. 20, 2015, provisional application No. 62/170,043, filed on Jun. 2, 2015, provisional application No. 62/163,750, filed on May 19, 2015, provisional application No. 62/024,723, filed on Jul. 15, 2014, provisional application No. 62/012,734, filed on Jun. 16, 2014, provisional application No. 61/900,199, filed on Nov. 5, 2013, provisional application No. 61/870,125, filed on Aug. 26, 2013, provisional application No. 61/754,522, filed on Jan. 18, 2013, provisional application No. 61/750,286, filed on Jan. 8, 2013, provisional application No. 61/747,051, filed on Dec. 28, 2012.

(56) References Cited

U.S. PATENT DOCUMENTS

| | | |
|---|---|---|
| 5,142,480 A | 8/1992 | Morrow |
| 5,459,469 A | 10/1995 | Schuchman et al. |
| 5,933,098 A | 8/1999 | Haxton |
| 5,974,349 A | 10/1999 | Levine |
| 6,148,179 A | 11/2000 | Wright et al. |
| 6,167,238 A | 12/2000 | Wright |
| 6,181,990 B1 | 1/2001 | Grabowsky et al. |
| 6,278,965 B1 * | 8/2001 | Glass ............... G06Q 10/025 701/120 |
| 6,353,779 B1 | 3/2002 | Simon et al. |
| 6,438,469 B1 | 8/2002 | Dwyer et al. |
| 6,553,333 B1 * | 4/2003 | Shenk ............... G06F 17/5095 701/3 |
| 6,573,841 B2 | 6/2003 | Price |
| 6,591,171 B1 * | 7/2003 | Ammar ............... F41G 7/2226 701/16 |
| 6,629,023 B1 | 9/2003 | Slider, Jr. et al. |
| 6,804,585 B2 | 10/2004 | Humbard et al. |
| 6,980,959 B1 * | 12/2005 | Garrow ............... G06Q 10/06 705/7.21 |
| 7,006,032 B2 | 2/2006 | King et al. |
| 7,061,401 B2 | 6/2006 | Voos et al. |
| 7,167,782 B2 | 1/2007 | Humbard et al. |
| 7,295,135 B2 | 11/2007 | Younkin |
| 7,305,286 B1 | 12/2007 | Younkin et al. |
| 7,489,992 B2 | 2/2009 | Valette et al. |
| 7,505,835 B2 | 3/2009 | Brust et al. |
| 7,689,328 B2 * | 3/2010 | Spinelli ............... G01C 21/20 340/945 |
| 7,698,025 B1 | 4/2010 | Cornell et al. |
| 7,786,900 B2 | 8/2010 | Bitar et al. |
| 7,874,521 B2 | 1/2011 | Shuster |
| 7,908,042 B2 | 3/2011 | Brinkley et al. |
| 8,027,758 B2 | 9/2011 | Ferro et al. |
| 8,035,547 B1 | 10/2011 | Flanigan et al. |
| 8,087,616 B2 | 1/2012 | Shuster |
| 8,131,407 B1 | 3/2012 | Robinson |
| 8,140,260 B2 | 3/2012 | Feyereisen et al. |
| 8,190,727 B2 | 5/2012 | Henkel |
| 8,234,068 B1 | 7/2012 | Young et al. |
| 8,244,455 B2 * | 8/2012 | Case ............... G01C 21/005 701/123 |
| 8,292,234 B2 | 10/2012 | Shuster |
| 8,356,776 B2 * | 1/2013 | Berens ............... B64C 9/16 244/183 |
| 8,457,889 B2 | 6/2013 | Feyereisen et al. |
| 8,477,061 B1 | 7/2013 | Pedersen |
| 8,543,264 B1 | 9/2013 | Tomas |
| 8,629,788 B1 | 1/2014 | Greenleaf et al. |
| 8,983,687 B1 * | 3/2015 | Hunter ............... G08G 5/0056 340/968 |
| 9,026,275 B1 | 5/2015 | Young et al. |
| 9,047,762 B1 | 6/2015 | Neuville et al. |
| 9,253,753 B2 | 2/2016 | Rubin et al. |
| 9,257,047 B2 | 2/2016 | Bailey et al. |
| 9,280,903 B2 | 3/2016 | Judy et al. |
| 9,349,296 B2 | 5/2016 | Wiesemann et al. |
| 9,355,564 B1 | 5/2016 | Tyson et al. |
| 9,527,587 B2 | 12/2016 | Levien et al. |
| 9,536,433 B2 | 1/2017 | Savarit et al. |
| 9,542,849 B1 | 1/2017 | Bertram et al. |
| 9,567,097 B2 | 2/2017 | Horsager et al. |
| 9,567,099 B2 | 2/2017 | Poux et al. |
| 9,583,010 B1 | 2/2017 | Kolek et al. |
| 9,640,079 B1 | 5/2017 | Moravek et al. |
| 9,646,502 B1 | 5/2017 | Gentry |
| 9,685,090 B2 | 6/2017 | Kneuper et al. |
| 9,691,286 B2 | 6/2017 | Bahrami et al. |
| 9,704,405 B2 | 7/2017 | Kashi et al. |
| 9,728,090 B2 | 8/2017 | Bitar et al. |
| 9,728,093 B2 | 8/2017 | Wiesemann et al. |
| 9,733,349 B1 | 8/2017 | Wood et al. |
| 2003/0093187 A1 | 5/2003 | Walker |
| 2004/0249519 A1 | 12/2004 | Frink |
| 2005/0156777 A1 | 7/2005 | King et al. |
| 2005/0261814 A1 | 11/2005 | Ryan et al. |
| 2006/0031006 A1 | 2/2006 | Stenbock et al. |
| 2007/0018052 A1 | 1/2007 | Eriksson |
| 2007/0194171 A1 | 8/2007 | Diamandis et al. |
| 2008/0154447 A1 | 6/2008 | Spinelli |
| 2008/0195309 A1 | 8/2008 | Prinzel, III et al. |
| 2009/0027232 A1 | 1/2009 | Lavielle et al. |
| 2009/0152391 A1 | 6/2009 | McWhirk |
| 2010/0057899 A1 | 3/2010 | Henkel |
| 2010/0085236 A1 | 4/2010 | Franceschini et al. |
| 2010/0095084 A1 | 4/2010 | Manning |
| 2010/0109865 A1 | 5/2010 | Armstrong |
| 2010/0328138 A1 * | 12/2010 | Guigne ............... G01S 13/878 342/33 |
| 2011/0184593 A1 * | 7/2011 | Swope ............... G05D 1/101 701/12 |
| 2011/0215922 A1 | 9/2011 | Armstrong |
| 2011/0264312 A1 * | 10/2011 | Spinelli ............... G08G 5/0021 701/16 |
| 2011/0298618 A1 | 12/2011 | Stahl et al. |
| 2012/0143482 A1 | 6/2012 | Goossen et al. |
| 2012/0177198 A1 | 7/2012 | Cabos |
| 2012/0191273 A1 | 7/2012 | Jacobs et al. |
| 2012/0221175 A1 | 8/2012 | Spinelli |
| 2013/0131970 A1 | 5/2013 | Pendry et al. |
| 2013/0197721 A1 | 8/2013 | Gu et al. |
| 2013/0242864 A1 | 9/2013 | Vermande et al. |
| 2013/0274964 A1 * | 10/2013 | Jesse ............... B64D 45/00 701/14 |
| 2014/0129058 A1 * | 5/2014 | Elahi ............... G08G 5/0021 701/16 |
| 2014/0152507 A1 | 6/2014 | McAllister |
| 2014/0197980 A1 | 7/2014 | Schulte et al. |
| 2014/0210648 A1 | 7/2014 | Samuthirapandian et al. |
| 2014/0222248 A1 | 8/2014 | Levien et al. |
| 2014/0249693 A1 | 9/2014 | Stark et al. |
| 2014/0257692 A1 | 9/2014 | Stefani et al. |
| 2014/0297068 A1 * | 10/2014 | Revell ............... G06K 9/00637 701/16 |
| 2014/0304107 A1 | 10/2014 | McAllister |
| 2014/0327564 A1 | 11/2014 | Sampigethaya |
| 2015/0077270 A1 | 3/2015 | Rubin et al. |
| 2015/0081201 A1 | 3/2015 | Rubin et al. |
| 2015/0170524 A1 | 6/2015 | Stefani et al. |
| 2015/0296500 A1 | 10/2015 | Kanovsky et al. |
| 2015/0344149 A1 | 12/2015 | Mumaw et al. |
| 2015/0356873 A1 | 12/2015 | Kneuper et al. |
| 2016/0012289 A1 | 1/2016 | Petit |
| 2016/0027310 A1 | 1/2016 | Samuthirapandian et al. |
| 2016/0107751 A1 | 4/2016 | D'Andrea et al. |
| 2016/0117931 A1 | 4/2016 | Chan et al. |
| 2016/0244187 A1 | 8/2016 | Byers et al. |
| 2016/0284222 A1 | 9/2016 | Nicholls et al. |
| 2017/0229024 A1 | 8/2017 | Moravek et al. |

* cited by examiner

MISSION MONITOR AND CONTROLLER FOR AUTONOMOUS UNMANNED VEHICLES

CROSS-REFERENCE TO RELATED APPLICATIONS

For purposes of the USPTO extra-statutory requirements, the present application constitutes a continuation of the United States patent application entitled MISSION MONITOR AND CONTROLLER FOR AUTONOMOUS UNMANNED VEHICLES, application Ser. No. 15/243,752, filed Aug. 22, 2016, which application is currently co-pending.

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. patent application Ser. No. 14/142,390, entitled FLIGHT ASSISTANT WITH AUTOMATIC CONFIGURATION AND LANDING SITE SELECTION, filed Dec. 27, 2013;

U.S. patent application Ser. No. 14/741,283, entitled FLIGHT ASSISTANT WITH AUTOMATIC CONFIGURATION AND LANDING SITE SELECTION METHOD AND APPARATUS, filed Jun. 16, 2015, which issued Apr. 12, 2016 as U.S. Pat. No. 9,310,222;

U.S. patent application Ser. No. 15/159,202, entitled UNMANNED VEHICLE CONTROL SYSTEM AND APPARATUS, filed May 19, 2016, which issued Nov. 21, 2017 as U.S. Pat. No. 9,821,910;

and U.S. Provisional Patent Application Ser. No. 61/747,051, filed Dec. 28, 2012; Ser. No. 61/750,286, filed Jan. 8, 2013; Ser. No. 61/754,522, filed Jan. 18, 2013; Ser. No. 61/870,125, filed Aug. 26, 2013; Ser. No. 61/900,199, filed Nov. 5, 2013; Ser. No. 62/012,734, filed Jun. 16, 2014; Ser. No. 62/024,723, filed Jul. 15, 2014; Ser. No. 62/163,750, filed May 19, 2015; Ser. No. 62/170,043, filed Jun. 2, 2015; Ser. No. 62/207,835, filed Aug. 20, 2015; and Ser. No. 62/210,686, filed Aug. 27, 2015.

TECHNICAL FIELD

The invention is generally related to autonomous vehicles and more specifically to a system and apparatus for monitoring the performance of one or more autonomous unmanned vehicles.

SUMMARY OF THE INVENTION

Like manned counterparts, autonomous unmanned vehicles may be utilized to perform complex operations. In particular, unmanned aircraft systems (UAS) may be programmed to fly mission profiles requiring the traversal of obstacles (both known and unknown during planning), various airspace requirements, conflicting pre-programmed goals, weather, micro-weather, convection currents, wake turbulence, mechanical turbulence, non-optimal UAS system performance, loading and weight-and-balance issues, traffic, social or operational concerns, and system failures. Thus, the success of any UAS mission may require a real-time (enroute) modification based upon the environment and conditions a particular UAS must traverse. In operation the present invention may be utilized to continuously monitor a single UAS or a fleet of UAS. In a first embodiment autonomous UAS are equipped with means for determining position (GNSS or the like) relative to at least one programmed mission (or flight profile) or series of missions (flight profiles).

UAS, whether winged or rotary, must produce lift to overcome mass, and produce thrust to overcome drag. Generally, all UAS operate about three axes of flight, namely longitudinal, lateral, and vertical. Variable thrust is utilized to obtain and maintain required performance. In operation, a winged UAS may operate to roll, pitch and yaw within a design performance envelope. Likewise rotorcraft such as multirotor UAS (quadcopters and the like), may also roll, pitch, and yaw via differential thrust within a design performance envelope.

An additional embodiment of the present invention may include a system for determining UAS flight configuration during a flight, implemented by at least one computing device, comprising: an UAS state module configured to: establish UAS position, altitude, and trajectory based upon UAS position and altitude over time; establish UAS flight segment based on at least one of time since departure, position and altitude, and trajectory; determine UAS attitude from sensing at least one of angle and rate for at least one of pitch, bank, and yaw; sense UAS acoustics from at least one of airframe vibration and UAS sound; a configuration evaluator module configured to: determine an expected UAS configuration based at least in part on said established UAS flight segment; determine UAS configuration from said sensed UAS attitude and said UAS acoustics for UAS configurations attributable to said sensed attitude and acoustics for said flight segment; and at least one display unit configured to announce a UAS configuration different from said expected UAS configuration. A UAS equipped with an embodiment of the present invention may alter its operation in order to increase safety, mission success, payload preservation, or in order to enhance the likelihood of successfully completing a mission or mission segment (one way, round trip, or multipoint).

An additional embodiment of the present invention monitors expected thrust requirements for flight segment with actual thrust requirements for flight segment (position) and predicts changes in thrust requirements to wind, turbulence, system disability and the like so as to determine continued mission viability.

An additional embodiment of the present invention may include a system wherein establishing UAS position, altitude, and flight trajectory is based on at least one of GNSS, VOR, VORTAC, ADF, LORAN-C, ADS-B, inertial navigation, radar, and programmed position-performance-time expectation.

An additional embodiment of the present invention may include a system wherein establishing a UAS flight segment is based on at least one of flight plan, flight profile history, departure and destination profile history, UAS attitude, UAS vibration, UAS acoustics, UAS acoustic history, and UAS consistent acoustic period.

An additional embodiment of the present invention may include a system wherein sensing UAS attitude is based on at least one of: accelerometer, magnetometer, flight control position detection (feedback), and detected (or derived) angle and rate of at least one of pitch, bank, and yaw.

An additional embodiment of the present invention may include a system wherein sensing UAS acoustics is based on at least one of: microphone, seismometer and other like vibration sensor, velocity sensor, payload (or auxiliary equipment or sensors), and motor (engine) instrumentation.

An additional embodiment of the present invention may include a system wherein sensing UAS acoustics is based at least in part on identifying acoustic profiles associated with at least one of battery charge (or fuel available, payload, wind noise, vibration, flight control position, and pitch angle.

An additional embodiment of the present invention may include a system wherein determining an expected UAS configuration is based in part on at least one of: a technical order, UAS flight manual, operating handbook, pilot (or less pejorative to pilots: "programmer" or "operator" or "monitor") input, flight envelope, lift-to-drag ratio, UAS position, UAS altitude, UAS flight segment, time since departure, estimated time enroute, estimated time to arrival, and flight plan adjusted for environmental conditions determined from at least one of ground wind speed and direction, aloft wind speed and direction, thrust level, UAS acoustics, angle of attack, drag, weather, traffic, air traffic control instructions, flight control response times, UAS system condition, company instructions, maintenance, mission plan, actual performance versus expected performance, expected position versus actual position and the like.

An additional embodiment of the present invention may include a system wherein determining UAS configuration is based in part on at least one of UAS vibration and UAS acoustics (vehicle loaded/unloaded), and flight segment.

An additional embodiment of the present invention may include a system wherein announcing an UAS configuration different from said expected UAS configuration is based on a user-selectable hierarchy of likely unexpected configurations.

An additional embodiment of the present invention may include a system wherein an UAS configuration different from said expected UAS configuration includes an unexpected change in UAS acoustics.

An additional embodiment of the present invention may include a system wherein perceiving an UAS configuration different from said expected UAS configuration is acted on by an embodiment of the present invention according to a hierarchy of mission criticality and according to system certainty.

An additional embodiment of the present invention may include a system wherein detecting an UAS configuration different from said expected UAS configuration becomes more specific as system certainty of a specific difference in configuration.

An additional embodiment of the present invention may include a system including announcing an UAS configuration different from said expected configuration via radio frequency notification, graphic display, audio tone, and haptic notification.

An additional embodiment of the present invention may include a system for directing a UAS to a reachable alternative landing site, implemented by at least one computing device, comprising: an UAS state module configured to determine at least one of current UAS trajectory, anticipated future UAS position and altitude, and anticipated future trajectory; a trajectory evaluator module configured to: determine at least one of expected UAS position, altitude, and trajectory based on at least one of time since departure, position, altitude, groundspeed, and heading; determine a difference between: at least one of said current UAS trajectory, said future position and altitude, and said future trajectory; and at least one of said expected position, altitude, and trajectory; determine the magnitude of difference between said current UAS trajectory and said future position, altitude, and trajectory and said expected position, altitude, and trajectory; determine the rate of change of said magnitude of difference; determine whether a difference between said current UAS trajectory and said future position, altitude, and trajectory and said expected position, altitude, and trajectory is the result of an emergency at least in part from said magnitude of difference and at least one of traffic and weather deviation, flight plan change, air traffic control requirement, and arrival change; an alternative landing module configured to: determine a level of emergency, where the emergency has been determined, from a hierarchy of emergencies, selected from at least one of land immediately, land as soon as possible, and land as soon as practicable; continually select from a hierarchy of selectable landing site preferences and said selected level of emergency at least one alternative landing site at least one of reachable by said current trajectory and reachable by an available configuration change; prepare a procedure for safely positioning said UAS in a landable configuration at the approach of said reachable alternative landing site; and at least one of a display unit configured to announce at least one of said prepared procedure and a flight control instruction set for in seriatim programming an afflicted UAS with said prepared procedure.

An additional embodiment of the present invention may include a system wherein determining at least one of current UAS trajectory, anticipated future UAS position and altitude, and anticipated future trajectory is based on at least one of GNSS, VOR, VORTAC, ADF, LORAN-C, ADS-B, inertial navigation, radar, and pilot input.

An additional embodiment of the present invention may include a system wherein determining at least one of expected UAS position, altitude, and trajectory is based on at least one of: flight plan, flight profile history, departure and destination profile history, UAS attitude, UAS vibration, UAS acoustics, UAS acoustic history, and consistent acoustic period.

An additional embodiment of the present invention may include a system wherein determining said difference between said current UAS trajectory, said future position and altitude, and said future trajectory and said expected position, altitude, and trajectory is based on a user-selectable hierarchy of likely unexpected configurations.

An additional embodiment of the present invention may include a system wherein determining the magnitude of difference between said current UAS trajectory and said future position, altitude, and trajectory and said expected position, altitude, and trajectory is based on a user-selectable hierarchy of likely unexpected configurations.

An additional embodiment of the present invention may include a system wherein determining whether said difference between said current UAS trajectory and said future position, altitude, and trajectory and said expected position, altitude, and trajectory is the result of an emergency is based on a user-selectable hierarchy of likely unexpected configurations. An additional embodiment of the present invention may include a system wherein determining at least one of expected UAS position, altitude, and trajectory is based on at least one of: flight plan, flight profile history, departure and destination profile history, UAS attitude, UAS vibration, UAS acoustics, UAS acoustic history, and consistent acoustic period.

An additional embodiment of the present invention may include a system wherein determining said difference between said current UAS trajectory, said future position and altitude, and said future trajectory and said expected position, altitude, and trajectory is based on a user-selectable hierarchy of likely unexpected configurations.

An additional embodiment of the present invention may include a system wherein determining the magnitude of difference between said current UAS trajectory and said future position, altitude, and trajectory and said expected position, altitude, and trajectory is based on a user-selectable hierarchy of likely unexpected configurations.

An additional embodiment of the present invention may include a system wherein determining whether said difference between said current UAS trajectory and said future position, altitude, and trajectory and said expected position, altitude, and trajectory is the result of an emergency is based on a user-selectable hierarchy of likely unexpected configurations.

An additional embodiment of the present invention may include a system wherein said level of emergency is received from at least one of current position and altitude, current trajectory, and manual selection by a pilot or monitor or operator or controller.

An additional embodiment of the present invention may include a system wherein said hierarchy of selectable landing site preferences includes: a full service droneport with on-site emergency services and sufficient accommodations for payload manifest; a droneport with suitable runway and some on-site services; a droneport with hard surface runway of sufficient width and length; a droneport with an unpaved landing area; and where safety of citizens and property: (1) a highway and other road; (2) a field and other open area; (3) sloping and rough terrain with guidance between rocks, trees, and other ground obstructions; (4) bodies of water; and (5) other mixed consistency surfaces.

An additional embodiment of the present invention may include a system wherein the attributes of selectable landing sites are periodically updated to reflect at least one of: current season, crop type, road and water traffic, UAS maintenance, air traffic control requests, weather and traffic.

An additional embodiment of the present invention may include a system wherein preparing a procedure for safely positioning said UAS in a landable configuration includes compliance with at least one of emergency level procedures, standard operating procedure, drift-down procedure, and obstacle avoidance procedure.

An additional embodiment of the present invention may include a system wherein said display unit is further configured to announce at least one alternative landing site range reachable by the said UAS, in the form of an ellipse corresponding to the selected emergency level.

An additional embodiment of the present invention may include a system for presenting appropriate available alternative landing sites during a flight, implemented by at least one computing device, comprising: an UAS state module configured to determine flight environment from ground speed and at least one of: above ground level altitude, airspeed, descent rate, descent angle, ground wind speed and direction, aloft wind speed and direction, potential energy level, thrust level, sound level, angle of attack, drag, weather, traffic, air traffic control instructions, UAS system condition, company instructions, and flight segment; an alternative landing module configured to: receive an emergency level selectable at least from the set including: (1) land as soon as practicable, (2) land as soon as possible, and (3) land immediately; continually select from a hierarchy of selectable landing site preferences, said selected level of emergency, and said determined flight environment at least one alternative landing site reachable by at least one of a zero-thrust, partial-thrust, and normal-thrust standard and emergency operating procedure; and at least one flight controller to execute programming instructions to at least one alternative landing site range reachable by the said UAS.

An additional embodiment of the present invention may include a system wherein the emergency level is received from at least one of current position, current altitude, current trajectory, and manual selection by a pilot or controller or operator.

An additional embodiment of the present invention may include a system wherein continual selection of at least one alternative landing site is based at least in part on at least one service available at said alternative landing site (charging, payload rerouting, location beacon, or the like).

An additional embodiment of the present invention may include a system for assisting a pilot in an emergency, implemented by at least one computing device, comprising: an UAS state module configured to determine at least one of current UAS position and altitude, current UAS trajectory, anticipated future UAS position and altitude, and UAS performance from at least one of position and altitude over time and a sensor; a trajectory evaluator module configured to: determine at least one of expected UAS position and altitude, expected UAS trajectory, expected future UAS position and altitude, and expected UAS performance from at least one of a lookup register, position and altitude on a flight plan, time since departure, estimated time enroute, and estimated time of arrival; determine at least one of magnitude, expected magnitude, and rate of change of magnitude of difference between: at least one of said current position and altitude, said current UAS trajectory, said anticipated future position and altitude, and said UAS performance; and at least one of said expected position and altitude, said expected trajectory, said expected future position and altitude, and said expected performance; determine whether said magnitude is the result of at least one of traffic and weather deviation, flight plan change, air traffic control requirement, and arrival change; a configuration evaluator module configured to determine whether at least one of an UAS configuration error and an emergency exists based at least on one of said magnitude, said expected magnitude, and said rate of change of magnitude; an alternative landing module configured to: determine a level of emergency, where the emergency has been determined, from a hierarchy of emergencies, selected from at least one of land as soon as practicable, land as soon as possible, and land immediately; continually select, from a hierarchy of selectable landing site preferences and said selected level of emergency, at least one alternative landing site at least one of reachable by said current trajectory and reachable by an available configuration change; prepare a procedure for safely positioning said UAS in a landable configuration at the approach of said alternative landing site; and at least one implementation unit configured to implement and execute at least one of said prepared procedure and in seriatim the elements of said prepared procedure.

An additional embodiment of the present invention may include a system wherein said sensor is at least one of a ground-based sensor, satellite-based sensor, space-based sensor, and UAS sensor.

An additional embodiment of the present invention may include a system wherein said alternative landing module is further configured to continually select at least one alternative landing site reachable by at least one of a current thrust, current payload, ejected payload (no payload) zero-thrust, partial-thrust, and normal-thrust standard operating procedure.

An additional embodiment of the present invention includes a payload locator beacon and/or UAS locator beacon for assisting in locating an offsite payload and/or drone.

An additional embodiment of the present invention may include a system wherein said level of emergency is received from at least one of current position and altitude, current trajectory, and manual selection by a programmer or controller or monitor.

An additional embodiment of the present invention may include a system wherein said hierarchy of selectable landing site preferences includes: a full service droneport with on-site emergency services and sufficient accommodations for payload rerouting; a droneport with suitable runway and on-site services (fuel, charging, repair); a droneport with hard surface landing area of sufficient width and length; a droneport with an unpaved landing area; a highway and other road; a field and other open area; sloping and rough terrain with guidance between rocks, trees, and other ground obstructions; bodies of water; and other mixed consistency surfaces.

An additional embodiment of the present invention may include a system wherein the attributes of selectable landing sites are periodically updated to reflect at least one of: weather and traffic, current season, crop type, road and water traffic, and UAS condition.

An additional embodiment of the present invention may include a system wherein preparing a procedure for safely positioning said UAS in a landable configuration includes compliance with at least one of emergency level procedures, standard operating procedure, drift-down procedure, and obstacle avoidance procedure.

An additional embodiment of the present invention may include a system configured to program and instruct a UAS flight controller to at least one alternative landing site range reachable by the said UAS.

DETAILED DESCRIPTION

Figure 1:
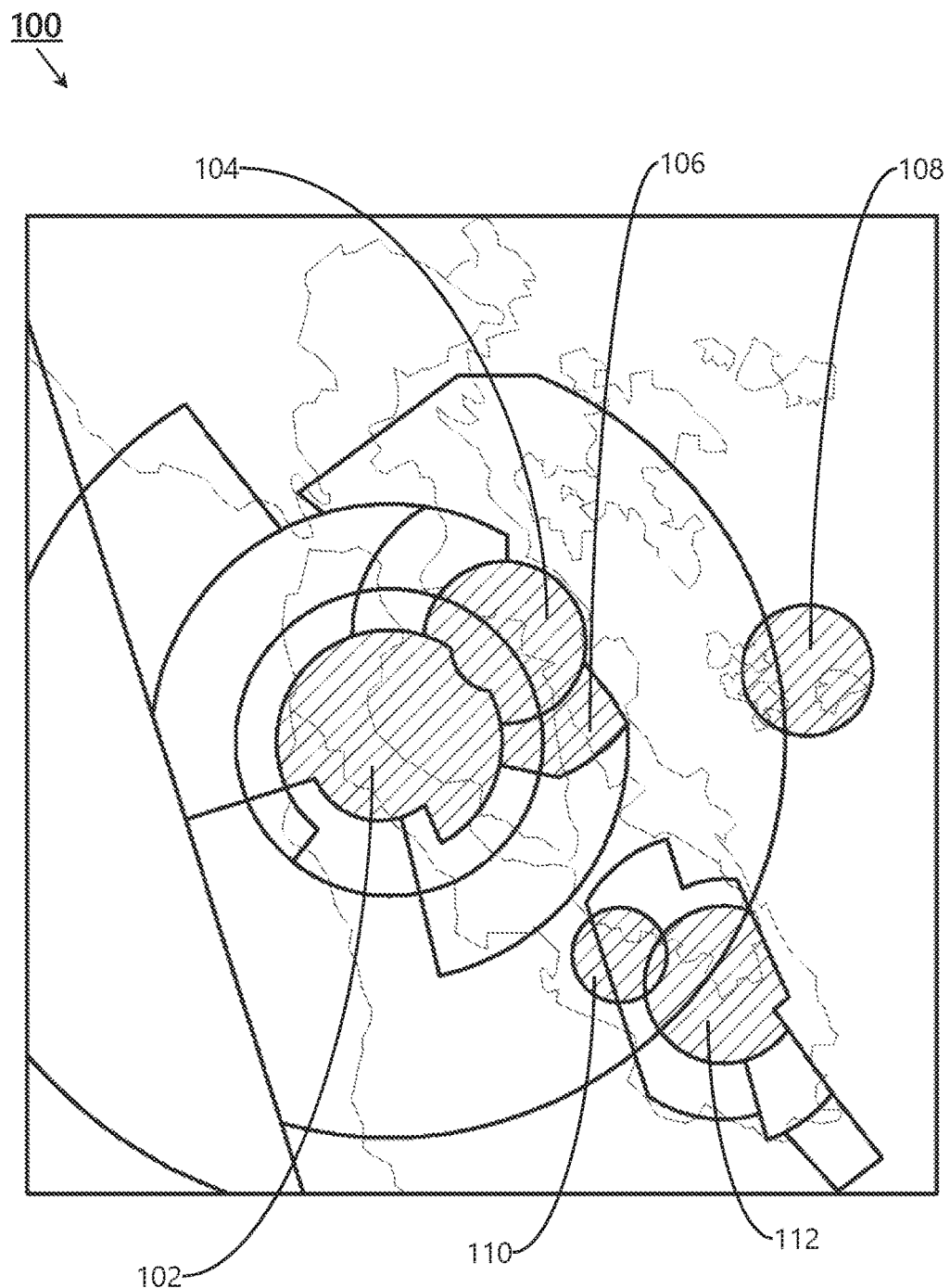
FIG. 1 is a highly diagrammatic top plan view of the San Francisco Bay area illustrating airspace coverage down to the surface and above.

In the context of embodiments of the present invention configuration and configured mean (1) the position of the UAS relative to an expected position, (2) the attitude of the UAS relative to an expected attitude, and (3) the position of controllable members and settings relative to expected settings. A flight plan may be described as a series of scalars describing the vector of an UAS from one location to another (gate-to-gate (bay-to-bay), loading dock, departure dock (platform), hanger-to-ramp, runway to runway, pad to pad, and the like). The vector describing this path will be altered in operation by, for example: (1) Controlling Authority (ATC or the like) (altitude changes, course changes, airspeed restrictions, arrival and departures, traffic, and holds or the like), (2) weather (deviations around, ground speeds, turbulence, and the like), and (3) UAS or operator (programmer or controller) performance. In an embodiment, system experience with a particular UAS or leg may be stored, compared, and made part of an analysis in determining what constitutes a departure from an expected vector (path). Deviation from what is expected may be tolerance dependent. For example, on takeoff, climb out, approach, and landing, system sensitivity to a deviation may be higher. Deviations resulting from Controlling Authority or weather may be ascertained, for example, by Controlling Authority communication patterns and/or manned and/or UAS traffic locations (i.e., a change in heading, altitude, and/or airspeed precedes an ATC/pilot communication) or by a change in weather condition or forecast received by an embodiment of the present invention not preceded by a change in heading, altitude, and/or airspeed (or the like). Thus, where a deviation is found unlikely (improbable) by the system of an embodiment of the present invention to be associated with Controlling Authority and/or weather, depending of flight phase/segment and the magnitude of the deviation, the system may predict a likely configuration error and under certain conditions it may suggest a configuration change. However, if altitude, airspeed, weather, or traffic indicates few safe options (e.g., loss of power on takeoff) an embodiment may immediately suggest an ALS with an associated procedure set (insufficient ALS options given the total energy TE available to the UAS).

In the context of embodiments of the present invention unusual condition means a deviation having a magnitude outside of a preselected range of acceptable values for a particular flight segment/phase. In a preferred embodiment a pilot, programmer, controller, monitor, user, dispatcher, owner, or other entity may preselect what constitutes an unusual condition for each segment/phase of flight. Conversely, a system of a preferred embodiment of the present invention may operationally determine a range of acceptable values for a particular UAS, segment, leg, or the like from past flight data.

In the context of embodiments of the present invention flight segment, flight phase, segment, phase, or segment/phase means a portion of a flight having a particular UAS configuration or desired UAS configuration. More particularly, in the context of an embodiment of the present invention an UAS in a certain configuration will produce a corresponding airspeed, rate of ascent/descent, course change, or the like. UAS being operated on a flight plan with an embodiment of the present invention and its associated database(s) in a particular segment of flight should be progressing along the desired vector (path) at an expected rate (relative to the ground and destination) within an expected tolerance. Deviations from expected tolerances may be user (pilot and the like) selectable and are presented to the pilot.

In addition, during each phase/segment of flight an UAS possess a finite energy state (kinetic+potential energy=total energy (KE+PE+TE)). UAS energy state (total energy) directly effects range. For example, an UAS at FL380 (38000 MSL) has more energy than one at 400 MSL.

Similarly an UAS at 500 knots and 500 MSL in a bombing run with full stores has more energy than one at 200 knots and 500 MSL. Energy equals options. An embodiment of the present invention monitors total energy and utilizes known total energy to ascertain available options by, for example, criticality and flight segment.

Figure 2:
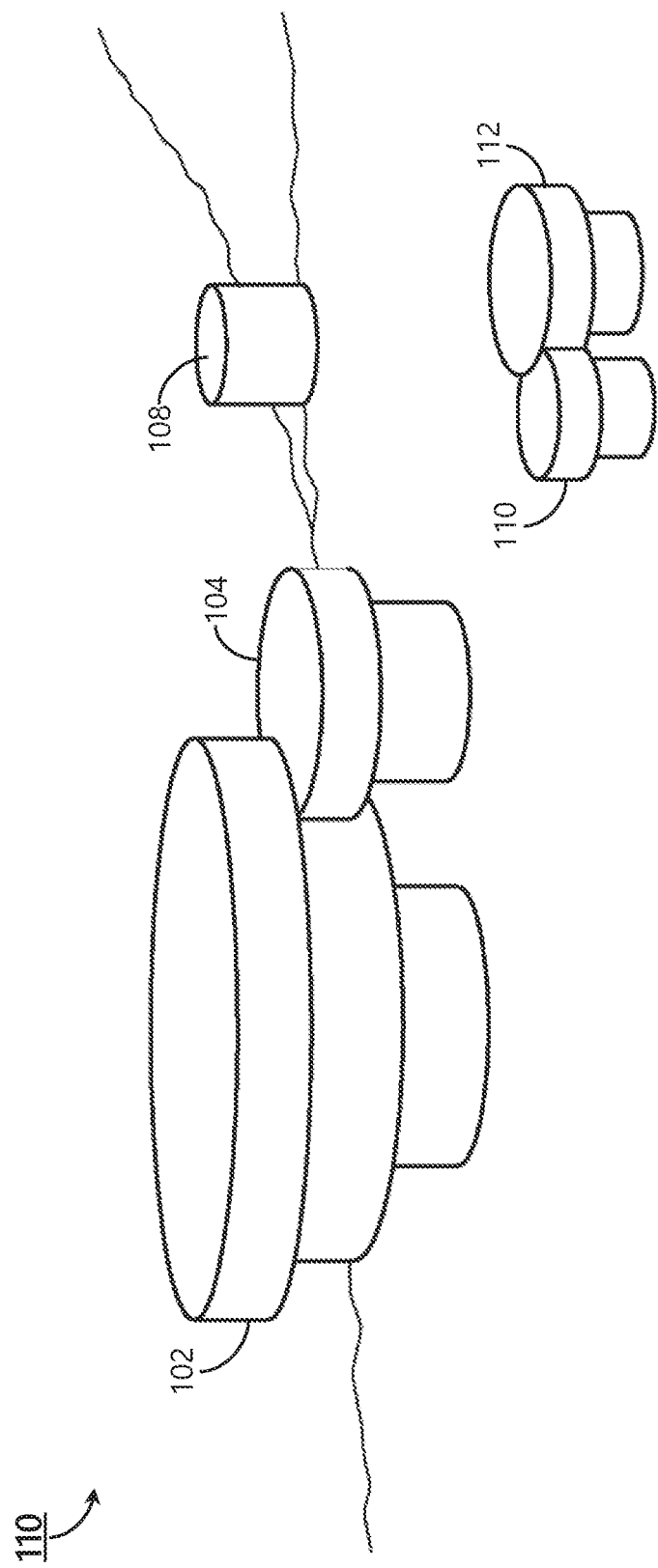
FIG. 2 is a highly diagrammatic partially isometric elevation of the San Francisco Bay area illustrating airspace coverage down to the surface and above.

FIG. 1 is a highly diagrammatic top plan view of the airspace 100 over the San Francisco metropolitan area. This metropolitan area includes over eight million souls. As can be seen a substantial surface area is within areas (102, 104, 106, 108, 110, 112) restricted to UAS operation. High priority and high value (HP & HV) items are substantially shipped in and out of airports. In an embodiment of the present invention droneports may be associated with existing airports for last mile delivery of HP & HV goods (see, for example Ser. No. 62/170,043, filed on 2 Jun. 2015). FIG. 2 is a highly diagrammatic isometric of the airspace 100 over the San Francisco metropolitan area, including the areas 102, 104, 108, 110, and 112.

Figure 3:
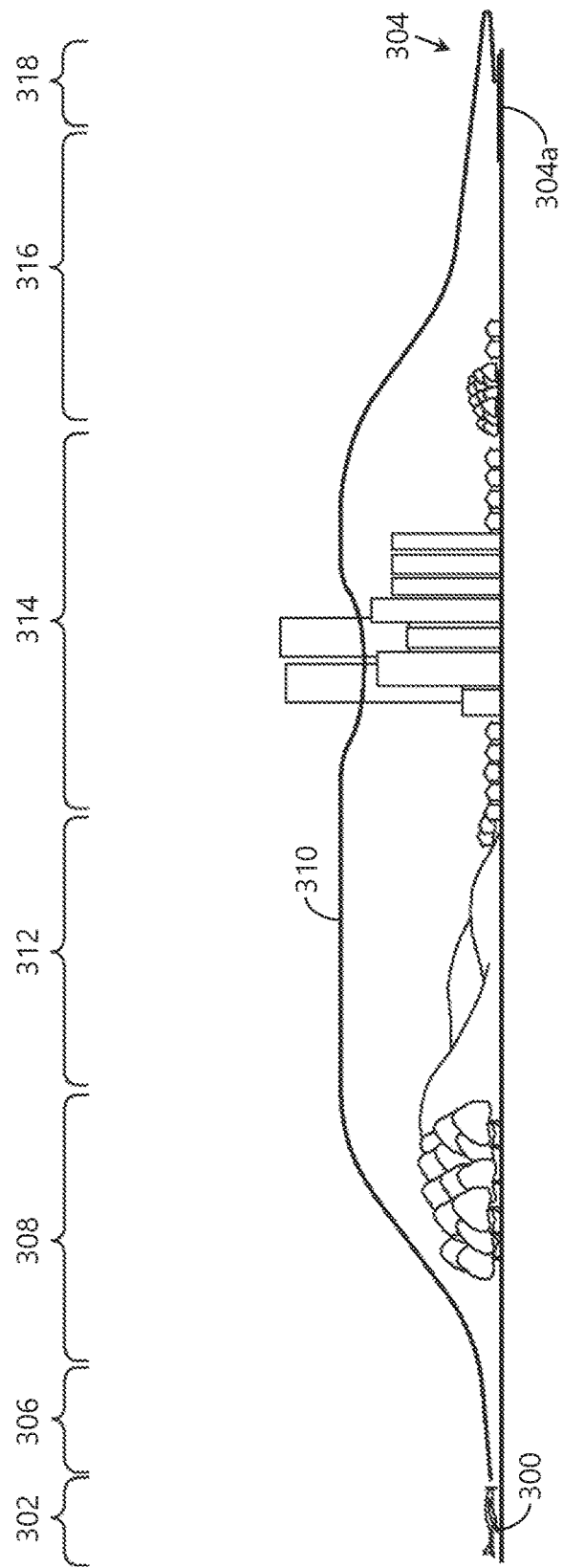
FIG. 3 is a highly diagrammatic side elevation of a one-way UAS mission profile.

FIG. 3 diagrammatically illustrates an UAS 300 departing from a droneport 302 for a destination airport 304 having landing pads 304a (runway). Depending on wind conditions the UAS 300 may be landing via any safe and standardized direction. In operation an UAS 300 may be expected to operate within an expected profile on a particular mission during flight operations (a flight plan or the like) and associated phases (segments) of flight. An UAS 300 on takeoff (306) and climb (308), in a preferred embodiment, will be considered in an unusual condition with even a slight deviation from the expected flight path (310). Corrective actions may be expected or prompted by the system when the unusual condition is detected. If the UAS 300 proceeds, for example, to a likely unusual condition the system of an embodiment of the present invention may abort the mission (eject a payload or the like) and/or land as safe as possible (or return to base (302) or a designated offsite emergency landing site). Should the UAS 300 appear to the system to be proceeding to a position (anticipated position) dangerous to the UAS, the system of an embodiment of the invention may initiate a UAS reconfiguration, flight plan cancellation or alteration, corrective action (or the like). An UAS 300 enroute (or transiting another less critical flight phase 312, 314) may deviate from expected position within a programmable range or the like before an embodiment of the present invention detects an unusual condition.

Figure 4:
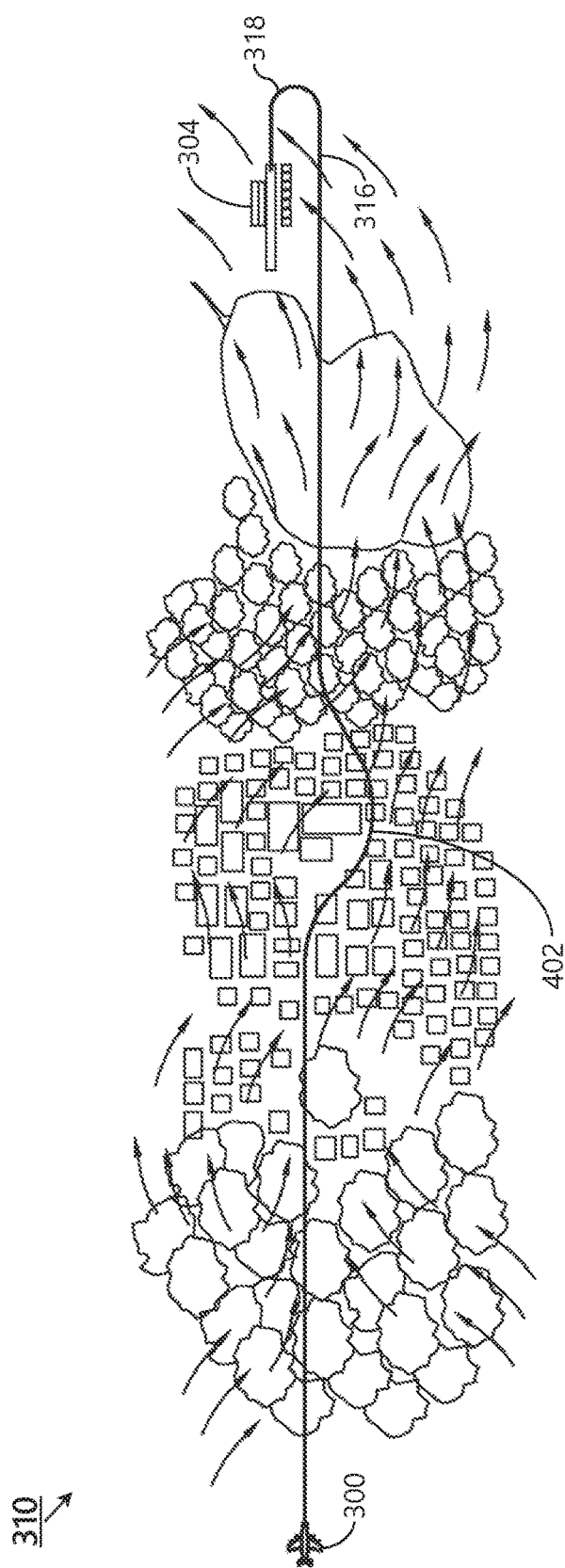
FIG. 4 is a highly diagrammatic top plan of a one-way UAS mission profile.

FIG. 4 is a diagrammatic elevation view of a flight plan 310 (expected path/course) of an UAS 300 from an originating droneport (302, FIG. 3) to a second droneport 304. The expected area of operation is narrower during takeoff (306, FIG. 3), climb (308, FIG. 3), descent approach (316), and landing (318). A variation in position is tolerated by an embodiment of the present position most preferably by altitude (AGL), airspeed (GS), and UAS configuration.

An UAS 300 on takeoff and climb (306/308, FIG. 3), in a preferred embodiment, will be considered in an unusual condition with even a slight deviation (402) from the expected flight path 310. Corrective actions may be expected or prompted by the system when the unusual condition is detected. If the UAS 300 proceeds, for example, to a likely unusual condition the system of an embodiment of the present invention will attempt to correct course. Where the UAS 300 is unable to maintain safe operation as a result of performance or obstacles (both known and unknown during planning), various airspace requirements, conflicting pre-programmed goals, weather, micro-weather, convection currents, wake turbulence, mechanical turbulence, non-optimal UAS system performance, loading and weight-and-balance issues, traffic, social or operational concerns, and/or system failures an embodiment of the present invention may execute the safest mission abort possible under the circumstances. Thus, the success of any UAS mission may require a real-time (enroute) modification based upon the environment and conditions a particular UAS must traverse. In operation the present invention may be utilized to continuously monitor a single UAS 300 or a fleet of UAS.

Should the UAS 300 appear to the system to be proceeding to a position an anticipated position dangerous to the UAS, the system of an embodiment of the invention may execute a mission recall or the like (based upon available performance for existing conditions).

In operation, a database of potential alternative landing sites (ALS's) may be created and maintained utilizing airport directory information, satellite imagery, survey data, surface temperature data (variations over time), traffic data, current and historic Landsat imagery, remote sensing (road and field), LDCM (Landsat Data Continuity Mission), TIRS (thermal infrared sensor), and the like. Airport directories such as AeroNav (www.aeronav.faa.gov), AOPA (www.aopa.org/members/airports), AirNav (www.airnav.com/airports), and world airport directories such as www.airport-directory.com and airport.airlines-inform.com may be utilized by embodiments of the present invention. The present invention may utilize satellite imagery such as Landsat, LDCM, TIRS and with terrain data from USGS (www.usgs.gov), WeoGeo, and TopoQuest, Google Maps and the like to determine the acceptability of potential off-airport landing sites. Likewise, road and traffic information may be analyzed for additional potential off-airport landing sites and incorporated into the ALS database via the flight assistant and through a subscription of an embodiment of the present invention. Generally, traffic data may be obtained via the onboard database associated with the network of GPS satellites (for general traffic patterns), US Department of Transportation traffic sensors, reflected data from GPS-enabled vehicles and mobile devices, or from aftermarket data providers and data aggregators such as Google Maps, Inrix, Radio Data Service, Sirius/XM, MSN, and the like.

An embodiment of the present invention may utilize data from the Automatic Dependent Surveillance-Broadcast (ADS-B) as well as the full complement of the Next Generation Air Transportation System (NextGen). In operation an embodiment of the present invention may receive traffic, weather, terrain, and flight information from ADS-B as an exclusive source (or enhancing cumulative or partially cumulative source) for processing by an apparatus of the present invention for detecting unusual conditions (positions) and configuration errors (and the like) and selectively suggesting either a new flight profile or flying a suggested flight profile.

For any given autonomous UAS operation there is an optimum flight profile. For any given autonomous UAS model (300) there are optimum configurations along the route of flight (310) and an anticipated (or expected) optimum flight profile characteristic of the UAS model's flight envelope. Each configuration for a given model and transition from a first and a second configuration is incumbent on, for example, a particular flight segment, for example, takeoff, climb, cruise, descent, approach, and landing. Other configurations may also exist, for example, obstacle avoidance, emergency descent, emergency climb, emergency landing (in the context of land (1) immediately, (2) as soon as possible, and (3) as soon as practical). Likewise, an autonomous unmanned craft ideally can make transitions autonomously in an embodiment of the present invention according to a programmed hierarchy.

In operation, any given model of UAS 300 flying a particular mission according to some expected or optimal flight profile consisting of expected flight segments with expected and/or desired UAS configurations, may distinguish its actual position relative to said mission defined as a series of expected or optimal waypoints (each waypoint being, e.g., a three-dimensional coordinate with at least one of an expected crossing time or the like).

Additionally, a mission may be one-way, round-trip, and/or a series of segments (round-trip or one-way). Each mission type may be defined according to an optimal or expected profile consisting of a series of waypoints where each waypoint may have an expected crossing time. Waypoints may be a series GNSS coordinates (or the like) with crossing times (or the like) based upon the performance of a particular UAS model with a particular payload and flight segment configuration. Each mission may have an expected start time, an actual start time, expected arrival time, and an actual arrival time.

A particular model of UAS 300 operating with a payload (602, FIG. 6), with a particular payload loading configuration (weight and balance from a given datum) will have an expected performance loaded, unloaded, or loaded in a particular fashion. Likewise, any given load will affect aerodynamics and performance for a mission and over a given set of flight segments for a particular model of UAS and for a particular UAS 300. For example, batteries (604, FIG. 6) and motors (606, FIG. 6) (engines), propellers, lift generating surfaces, control surfaces (608, FIG. 6), and the like have an optimum performance characteristic, which are effected by age, cycles, maintenance, surface condition (cleanliness and the like), atmospheric conditions, and the like.

Figure 5A:
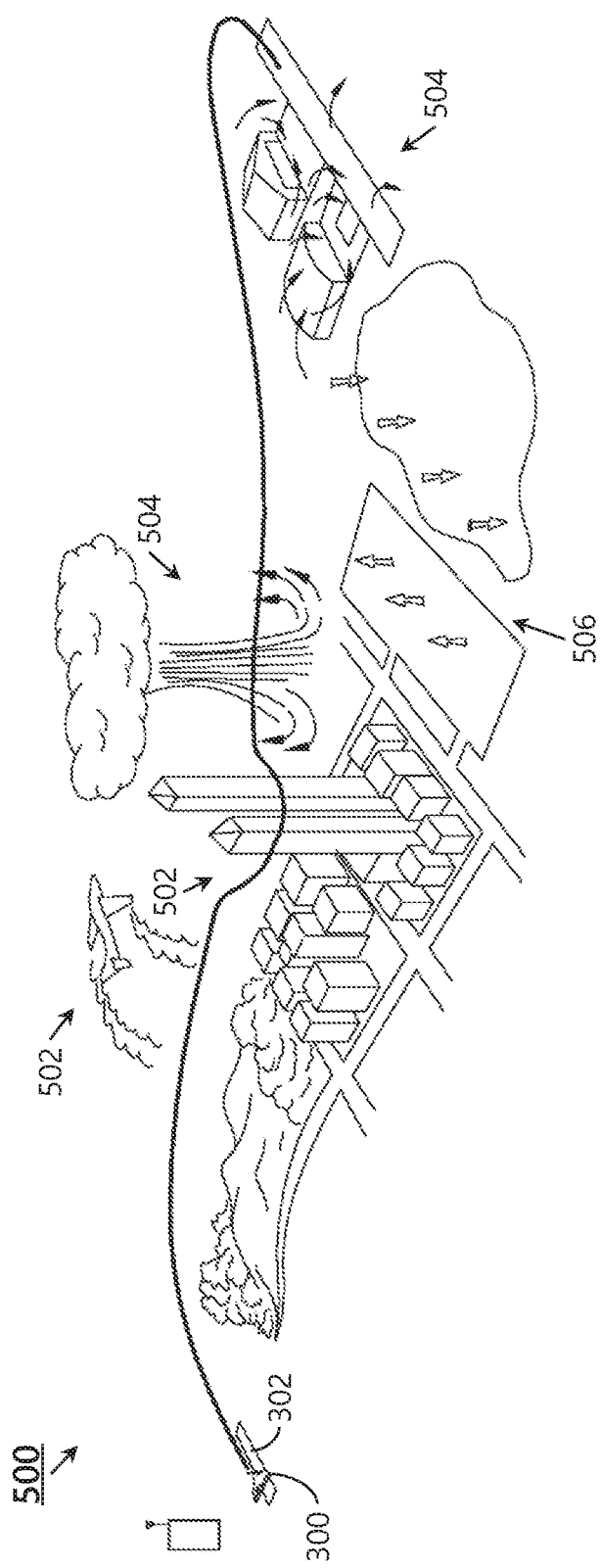
FIGS. 5A-5D are highly diagrammatic flight profile views illustrating various aspects of the autonomous monitoring system of the present invention.

Turning to FIGS. 5A-5D, various flight profiles of an embodiment of the autonomous UAS 300 utilizing at least some aspects of the present invention are shown. A portable or fixed RF link (610, FIG. 6) or the like may be maintained with the autonomous UAS 300 of the present invention. In FIG. 5A an autonomous UAS 300 of the present invention is illustrated ready to depart a mission (500) having a takeoff and landing over obstacles (502), within airspace, near or within areas (504) of wake turbulence (or potential wake turbulence), mechanical turbulence, micro-weather, weather, convection currents (506), and the like. As the UAS 300 endeavors to fly its optimal mission profile, at any given point in space and time, it may be either ahead of schedule, behind schedule, on profile, off profile (above, below, left, or right of course and profile), in configuration, out of configuration, in or within vibration limits (acoustic sensor based, microphone or the like) or expected range, at optimal angle of attack (inclinometer based (612, FIG. 6) or the like), expected fuel remaining versus fuel remaining (battery level and discharge rate (604, FIG. 6)), and the like.

At takeoff the UAS 300 has an expected load (602, FIG. 6) having an expected combined UAS+Payload center of gravity (and aerodynamic effect (lift/drag coefficient and the like). Any unexpected load condition (614, FIG. 6) will affect performance and the present invention will detect an anomaly in the expected profile (performance curve), e.g., actual position versus expected (optimal) position. Should an unsafe condition be detected, the UAS 300 may return to base (302), eject the payload 602, or the like, in order to minimize or prevent any damage to persons or property (in accordance with a programmed hierarchy and the many features of the present invention).

Figure 5B:
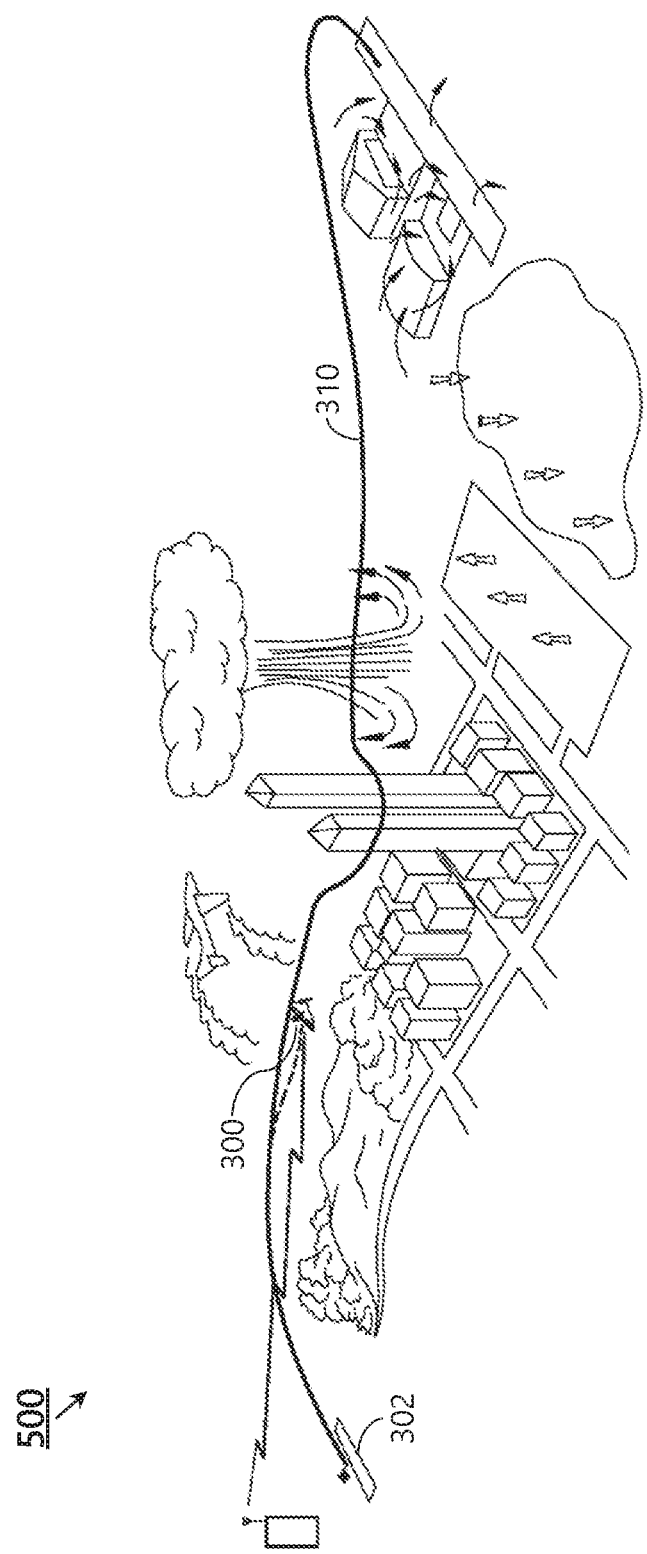

In FIG. 5B an autonomous UAS 300 of the present invention is illustrated as having been pushed off course (or the like). As the UAS endeavors to reacquire (intercept) its optimal mission profile (310), at any given point in space and time, it may be in a reduced state insufficient to safely complete its assigned mission (500).

Additionally, the UAS performance or range capabilities as reduced by being temporarily off course, or in encountering temporary or continuous or expected continuous unexpected (trying or difficult) conditions (headwind, down drafts, a required traffic avoidance maneuver) may have insufficient performance capability to safely execute or continue the desired mission 500. The present invention may continuously reassess mission status and, for example, determine the likelihood of completing the programmed mission 500 safely and satisfactorily. A payload 602 may be safely carried (delivered or utilized) by a particular UAS 300 in expected (forecast) conditions, but not in conditions outside of predicted values. Likewise, a payload 602 may shift, malfunction, or draw an unexpected amount of current or the like (camera, temperature control, life support, surveying or sensor equipment), and thereby reduce UAS performance as detected as an anomaly in the expected profile (performance curve), e.g., actual position versus expected (optimal) position (or the like). Should an unsafe condition be detected, the UAS 300 may return to base (302), eject the payload 602, or the like, in order to minimize or prevent any damage to persons or property (in accordance with a programmed hierarchy and the other many features of the present invention).

Figure 5C:
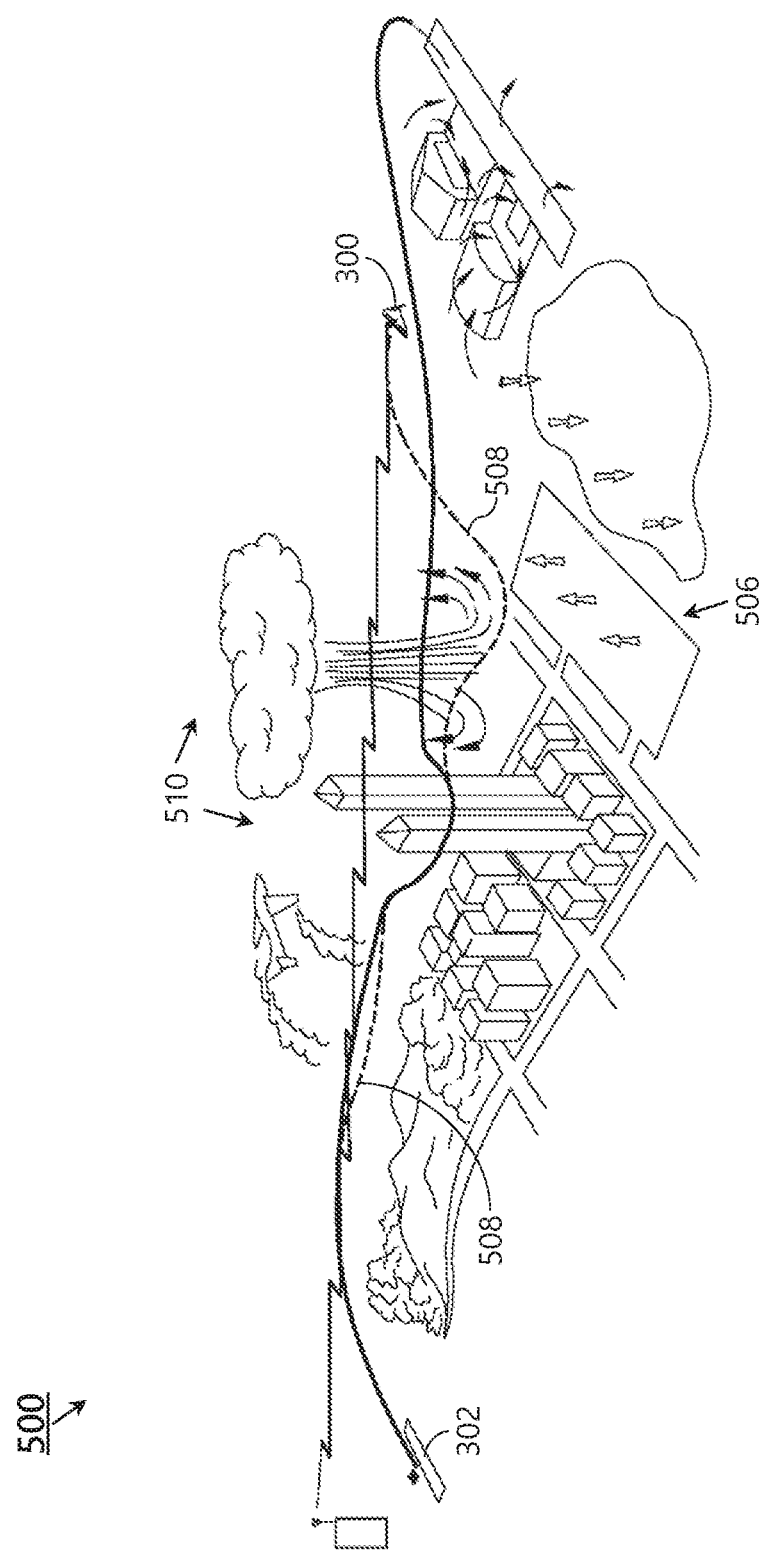

In FIG. 5C an autonomous UAS 300 of the present invention is illustrated as having been pushed above course (508) (or the like) by convection currents 506. As the UAS 300 endeavors to reacquire (intercept) its optimal mission profile, at any given point in space and time, it may be in a reduced state insufficient to safely complete its assigned mission 500.

Additionally, the UAS performance or range capabilities may be as reduced by being temporarily off course (508), or in encountering temporary or continuous or expected continuous unexpected (trying or difficult) conditions 510 (headwind, down drafts, a required traffic avoidance maneuver) may have insufficient performance capability to safely execute or continue the desired mission 500. The present invention may continuously reassess mission status and, for example, determine the likelihood of completing the programmed mission 500 safely and satisfactorily. A payload 602 may be safely carried (delivered or utilized) by a particular UAS 300 in expected (forecast) conditions, but not in conditions outside of predicted values. Likewise, a payload 602 may shift, malfunction, or draw an unexpected amount of current or the like (camera, temperature control, life support, surveying or sensor equipment), and thereby reduce UAS performance as detected as an anomaly in the expected profile (performance curve), e.g., actual position versus expected (optimal) position (or the like). Should an unsafe condition be detected, the UAS may return to base (302), eject the payload 602, or the like, in order to minimize or prevent any damage to persons or property (in accordance with a programmed hierarchy and the other many features of the present invention).

Figure 5D:
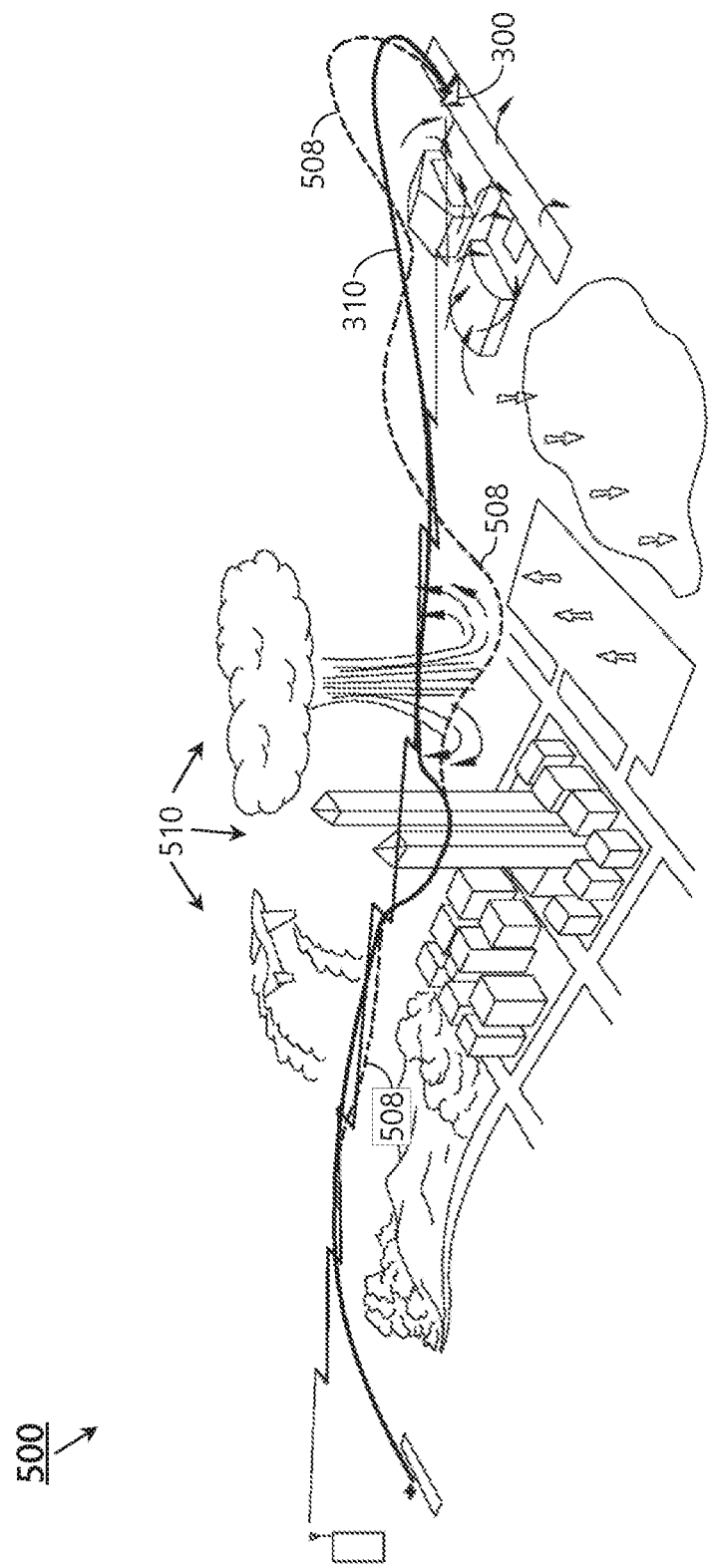

In FIG. 5D an autonomous UAS 300 of the present invention is illustrated as having determined it was capable of safely completing its programmed mission 500 after having traversed (508) several un-forecast conditions (or the like). The UAS 300 of the present invention has successfully reacquired (intercepted) its optimal mission profile (310) after having confronted unexpected conditions (510).

Additionally, the UAS 300 has continuously determined its performance or range capabilities were sufficient to successfully carry out its programmed autonomous mission 500. The present invention has continuously reassessed mission status and determined the mission 500 could be safely completed. Likewise, its payload (602, FIG. 6) was safely carried (delivered or utilized) by the UAS 300 of the present invention in spite of encountered unexpected conditions 510.

Figure 6:
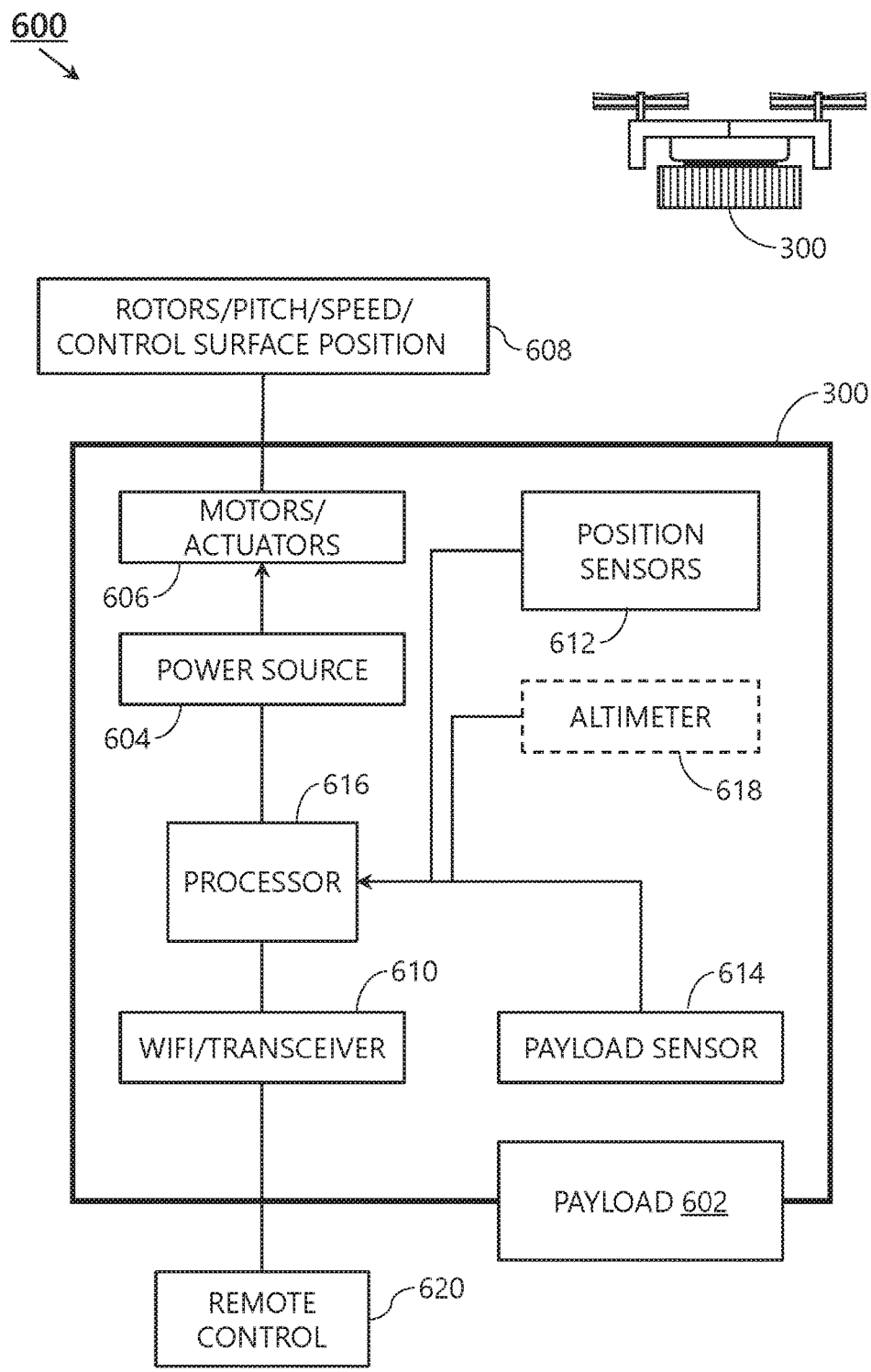
FIG. 6 is a block diagram of an embodiment of the present invention.

Turning now to FIG. 6, a block diagram of an embodiment of the present invention is provided. Lift generators and control surfaces (608) or the like may be operably driven, operated, monitored, and controlled with various aspects of the present invention. UAS, whether winged or rotary, must produce lift to overcome mass, and produce thrust to overcome drag. Generally, all UAS operate about three axes of flight, namely longitudinal, lateral, and vertical. Variable thrust is utilized to obtain and maintain required performance. In operation, a winged UAS may operate to roll, pitch and yaw within a design performance envelope. Likewise rotorcraft such as multirotor UAS (quadcopters and the like), may also roll, pitch, and yaw via differential thrust within a design performance envelope.

An additional embodiment of the present invention may include a system 600 for determining UAS flight configuration during a flight, implemented by at least one computing device (616), comprising: an UAS state module configured to: establish UAS position, altitude, and trajectory based upon UAS position (612) and altitude (618) over time; establish UAS flight segment based on at least one of time since departure, position and altitude, and trajectory; determine UAS attitude from sensing at least one of angle and rate for at least one of pitch, bank, and yaw; sense UAS acoustics from at least one of airframe vibration and UAS sound; a configuration evaluator module configured to: determine an expected UAS configuration based at least in part on said established UAS flight segment; determine UAS configuration from said sensed UAS attitude and said UAS acoustics for UAS configurations attributable to said sensed attitude and acoustics for said flight segment; and at least one display/remote control unit (620) configured to announce a UAS configuration different from said expected UAS configuration. A UAS equipped with an embodiment of the present invention may alter its operation in order to increase safety, mission success, payload preservation, or in order to enhance the likelihood of successfully completing a mission or mission segment (one way, round trip, or multi-point).

Figure 7:
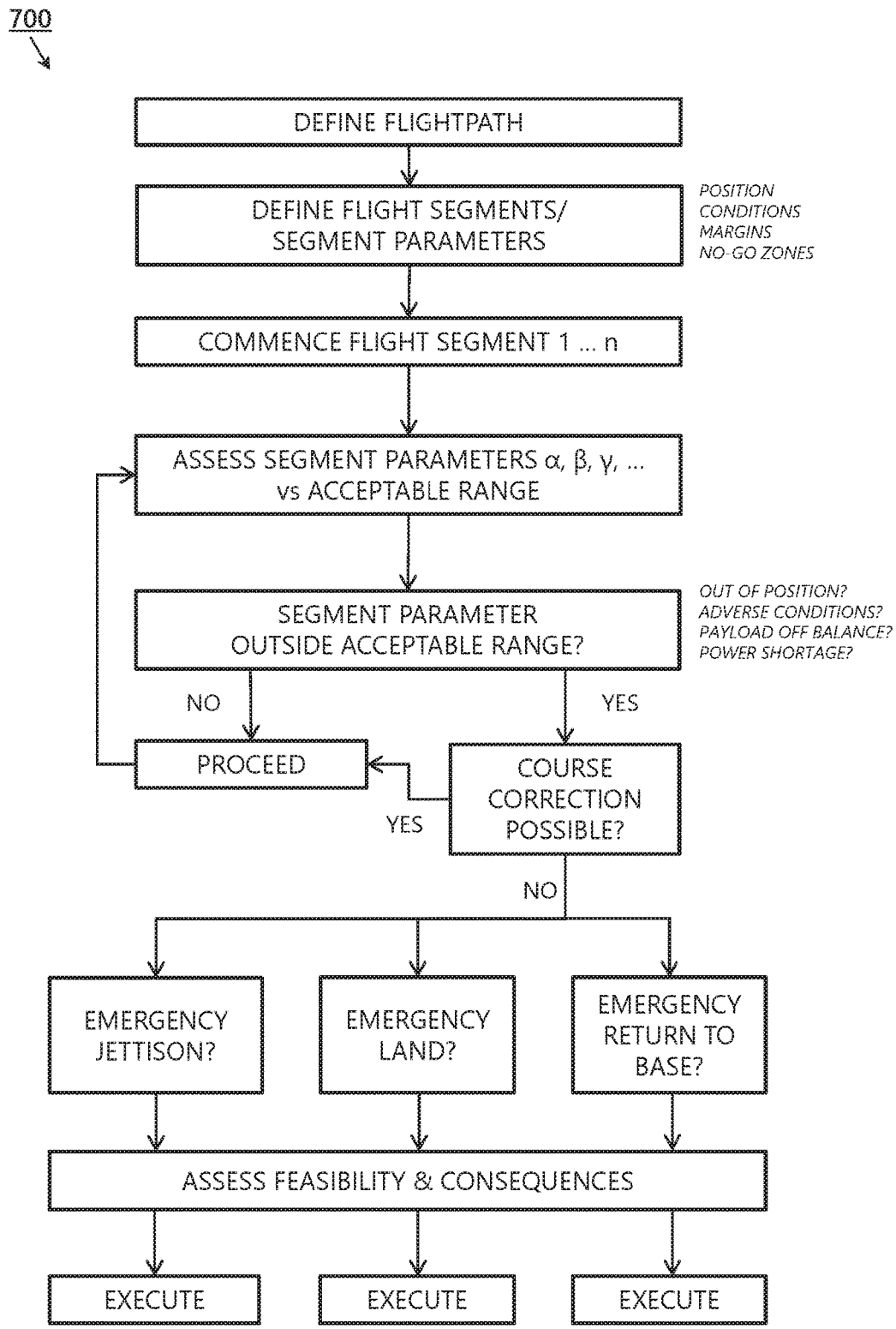
FIG. 7 is a flow diagram of an embodiment of the present invention.

FIG. 7 is a flow diagram of an embodiment of the present invention showing a system and apparatus for determining (700) whether a monitored mission (500, FIGS. 5A-D) may be automatically adjusted for completion or diversion.

We claim:

1. A flight control sending unit, comprising:
   at least one acoustic sensor attached to an aircraft, the acoustic sensor configured to sense an acoustic profile of the aircraft;
   and
   at least one processor coupled by at least one system bus to the acoustic sensor and to a control system of the aircraft, the processor configured to:
   (a) receive the sensed acoustic profile from the acoustic sensor;
   (b) receive one or more of a position of the aircraft and an altitude of the aircraft via the system bus;
   (c) determine a current flight segment of the aircraft based on the received position and the received altitude;
   (d) determine an expected configuration of the aircraft corresponding to the current flight segment;
   (e) determine a current configuration of the aircraft based on the sensed acoustic profile;
   (f) determine at least one deviation of the current configuration from the expected configuration by comparing the expected configuration and the current configuration;
   (g) detect at least one unusual condition associated with the current configuration by comparing the deviation to at least one threshold;
   (h) if the at least one unusual condition is detected, generate one or more instructions corresponding to a configuration change, the one or more instructions associated with at least one of a configuration correction and an emergency configuration; and
   (i) forward the one or more instructions to the control system.

2. The flight control sending unit of claim 1, wherein the expected configuration includes at least one of an expected position, an expected altitude, and an expected setting associated with at least one component of the aircraft.

3. The flight control sending unit of claim 1, wherein the configuration change includes at least one of:
   a change of the heading;
   and
   a landing of the aircraft.

4. The flight control sending unit of claim 1, wherein the position of the aircraft further comprises an x and y coordinate set conforming to at least one of: (1) a North American Datum, a North American Vertical Datum, a World Geodetic System, and a European Terrestrial Reference System; (2) a radial DME from a known fix; and (3) a triangulation of bearings from a plurality of known fixes.

5. The flight control sending unit of claim 1, wherein the altitude of the aircraft further comprises at least one of an Above Ground Level (AGL) altitude and a Mean Sea Level (MSL) altitude.

6. The flight control sending unit of claim 1, wherein:
   at least one of the expected configuration and the current configuration includes a status of a payload carried aboard the aircraft;
   and
   the configuration change includes a jettison of the payload.

7. The flight control sending unit of claim 1, wherein the current flight segment includes at least one of takeoff, ascent, transition, cruise, descent, approach, and landing.

8. The flight control sending unit of claim 1, wherein the current configuration includes a current energy state of the aircraft.

9. The flight control sending unit of claim 8, wherein the at least one processor is configured to determine one or more of:
   a reachable range relative to the position and corresponding to the current energy state;
   and
   one or more landing sites located within the reachable range.

10. The flight control sending unit of claim 1, wherein:
   the one or more landing sites are associated with a hierarchy of one or more nearest landing sites;

and
the emergency configuration is associated with at least one of landing immediately, landing as soon as possible, and landing as soon as practicable.

11. The flight control sending unit of claim 10, wherein the hierarchy of one or more nearest landing sites is associated with one or more of a landing site proximity to the aircraft, a slope, a width, a length, an indicated obstruction, and a proximate facility.

12. The flight control sending unit of claim 1, wherein the aircraft is an unmanned aircraft system (UAS), further comprising:
   at least one wireless transceiver communicatively coupled by wireless link to a control unit of the aircraft, the control unit located remotely from the aircraft;
   the at least one processor configured to:
   (1) transmit at least one parameter to the control unit via the wireless link, the at least one parameter including one or more of the position, the altitude, and the acoustic profile;
   and
   (2) forward to the control system control input received from the control unit, the control input associated with the transmitted parameter.

13. The flight control sending unit of claim 1,
   wherein the aircraft is a first aircraft and the processor is further configured to:
   receive flight environment information including at least one of traffic data, weather data, wind data, a flight plan of the first aircraft, terrain data, airport data, aircraft data associated with at least one second aircraft, a traffic control signal, a ground-based signal, a space-based signal, and an arrival pattern;
   and
   detect the at least one unusual condition by comparing the deviation to the at least one threshold based on the flight environment information.

14. The flight control sending unit of claim 13, wherein the configuration change includes at least one of:
   a change to the flight plan;
   a return of the aircraft to an origin point associated with the flight plan;
   and
   a landing of the aircraft corresponding to a landing site other than a destination point associated with the flight plan.

15. The flight control sending unit of claim 13, wherein the traffic data further comprise at least one of TCAS, radar, ATC feed, ADS-B, and road traffic.

16. The flight control sending unit of claim 13, wherein the terrain data further comprise at least one of a Digital Terrain Elevation Data (DTED) level 1 set, a DTED level 2 set, and satellite based imagery.

17. The flight control sending unit of claim 13, wherein the airport data further comprise at least one of a runway length, a runway width, a runway lighting, an indication of airport rescue and fire-fighting personnel, a proximal medical facility and a proximal maintenance facility.

18. The flight control sending unit of claim 13, wherein the weather data further comprise at least one of a surface wind, an altitude based wind model, a ceiling, a visibility, a barometric pressure, a braking action, and an illumination.

19. The flight control sending unit of claim 13, wherein the aircraft data further comprise at least one of a configuration of the second aircraft, a possible change in the configuration, a position of a control surface, a performance characteristic, a weight, a pilot flight control input, an autopilot status, an MEL status, a DTED level 1 set, a DTED level 2 set and satellite based imagery.

* * * * *